J. L. COYLE.
EGG BOX.
APPLICATION FILED AUG. 6, 1917.
1,269,394.
Patented June 11, 1918.
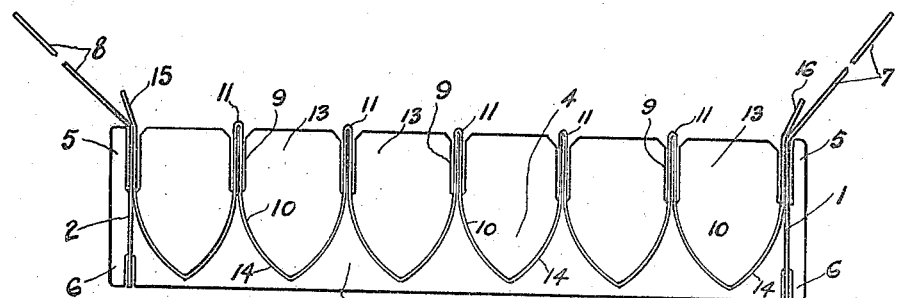
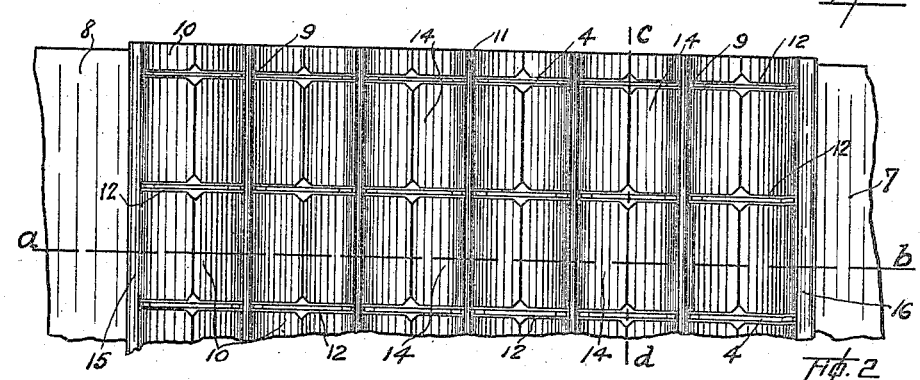
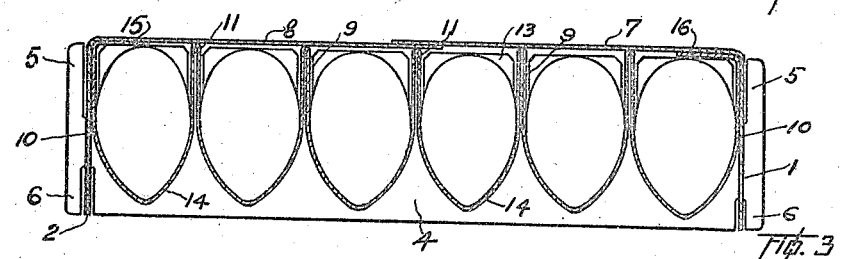
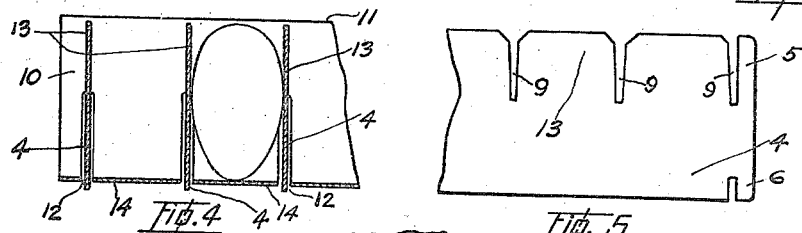
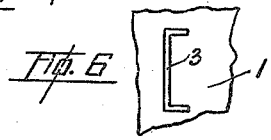
INVENTOR
JOSEPH LEOPOLD COYLE.
BY
ATTYS

UNITED STATES PATENT OFFICE.

JOSEPH LEOPOLD COYLE, OF SMITHERS, BRITISH COLUMBIA, CANADA.

EGG-BOX.

1,269,394.  Specification of Letters Patent.  Patented June 11, 1918.

Application filed August 6, 1917. Serial No. 184,747.

*To all whom it may concern:*

Be it known that I, JOSEPH LEOPOLD COYLE, a subject of the King of Great Britain, and a resident of the town of Smithers, in the Province of British Columbia, Canada, have invented certain new and useful Improvements in Egg-Boxes, of which the following is a specification.

My invention relates to improvements in egg boxes, and the object of my invention is to provide a simple, inexpensive, and safe receptacle for the carrying and handling of eggs in which the eggs are suspended and supported clear of each other so that the breakage is reduced to the minimum and in which receptacle is included a handy and convenient means for lifting out the eggs when desired. A further object is to provide a device of this nature the use of which makes it possible to inspect a case of eggs without lifting the eggs individually out of the egg box and which supports each egg in a convenient position for marking. A still further object is to devise an egg box which is capable of being constructed in a knock-down form so that it can be packed in quantities for convenient transportation and which may be re-assembled with great facility, and the construction of which is such that it may be manufactured and sold at a low cost, thereby providing a device which is of great advantage to the shipper and handler of eggs.

I attain these objects by the construction illustrated in the accompanying drawings in which—

Figure 1 is a view of my device in side elevation.

Fig. 2 is a partial plan view.

Fig. 3 is a sectional elevation taken on the line *a—b* of Fig. 2.

Fig. 4 is a fragmentary sectional view taken on the line *c—d* of Fig. 2.

Fig. 5 is a fragmentary detail view of a connecting wall.

Fig. 6 is a fragmentary view showing one of the end wall slots.

Similar figures of reference indicate similar parts throughout the several views.

The egg box is formed preferably of cardboard or the like and may be made of any size suitable to the requirements of trade, that is, it may be made to hold one dozen eggs or as many more or less as desired. It consists of the two end walls 1 and 2 perforated with slots 3, formed preferably as shown in Fig. 6, these slots being spaced apart at distances equal to the width of the compartments in which the eggs are contained, that is to say, suppose the box were designed to hold three dozen eggs in rows of six each, there would then be seven slots 3 in each end wall 1 and 2 respectively and extending between these end walls and secured thereto by passing their ends through the respective slots 3 are connecting walls 4, that is to say, in the box just taken for illustration there would be seven connecting walls 4 dividing the longitudinal space between the end walls into six compartments. The ends of each connecting wall are formed as shown in Fig. 5, that is, having the lugs 5 and 6 which may be bent over at right angles to correspond to the shape of the slots 3 so that the end of the wall may be passed therethrough and locked thereto by then straightening out the lugs 5 and 6, as shown in Figs. 1 and 3.

The end walls 1 and 2 are extended as shown partly broken away in Fig. 1 and fully in Fig. 3 to form cover flaps 7 and 8 for the box and also to provide a means for conveniently lifting the same.

The sub-dividing of the longitudinal compartments already mentioned is effected by providing a series of slots 9 in the connecting walls 4 which slots are spaced apart at distances equal to the width of the compartments in which the eggs are contained, that is to say, in the three dozen egg box there would be seven slots 9 in each wall. A filler 10 formed out of a flat sheet of stout paper folded into the shape shown in Figs. 1 and 3 is then placed in the slots 9, the doubled portions 11 of the filler forming walls fitting the slots, and to enable the filler to be fitted into place it is perforated with slots 12, as shown in Figs. 2 and 4, through which the portions 13 of the connecting walls between the slots 9 may pass. The filler extends the full width of the box and its length is such that when doubled and folded into the form shown in Fig. 3 and inserted in place the bottom of the concave pockets 14 will be supported a little above the lower edges of the connecting walls 4 while at the same time allowing the ends 15 and 16 of the filler to extend above the top of the box at each end to enable the filler to be gripped and raised out of the box when desired.

From the foregoing it will be seen that the box taken for illustration, that is, the three dozen size, is divided into six longitudinal compartments by the connecting walls 4 each of which compartments is in turn sub-divided into six transverse compartments by the transverse walls 11 formed by the doubled portions of the filler 10, these compartments being each of a width adapted to receive an egg and having a concave bottom on which the egg is supported at its lower end clear of contact with any other surface on which the bottom of the box may rest, the depth of the compartment being such that the top of the egg is below the upper edges of the walls 11. Further, it will be noted that the longitudinal walls 13 of each compartment are adapted to yield under sidewise pressure, so that the egg in the compartment will also yield and thus the eggs in the box are carried in a manner where they are not subject to direct pressure, being in effect cushioned on all sides and carried suspended, as it were, in the concave pockets of the filler 10, so that the risk of breakage is reduced to the minimum.

The convenience of the removable filler 10, in addition to its utility, will be apparent as it will be seen that by gripping either of its extended ends 15 and 16 and raising it the eggs may be lifted out of the box in a very convenient manner, and in the same manner the box itself may be handled by means of its cover flaps 7 and 8 so that it provides a great convenience both for the shipper when packing eggs for the market and also for the receiver when inspecting the eggs in the large cases in which these smaller boxes are transported.

When knocked-down the box consists of the two end walls, the connecting walls, and the filler, the filler being then folded into a substantially bellows formation with the walls 11 lying one on the other and the pockets 14 closed up, so that a number of complete boxes may be packed up into a compact parcel for convenient transportation and readily assembled by simply setting up the end walls, inserting therein the ends of the connecting walls and locking them as described and then opening out the filler and inserting it in place, after which the box is ready to receive the eggs.

It will be seen, therefore, that I have devised a simple, practical, and inexpensive box for carrying eggs the use of which enables them to be carried with the minimum of breakage and which provides a great convenience for those engaged in the shipping and handling of this commodity.

What I claim as my invention:

1. In an egg box, end walls provided with extensions forming cover flaps for the box, spaced connecting walls extending between said end walls, and detachably locked thereto, a series of catenated unitary egg enveloping pockets suspended from and between said connecting walls, the bottoms of said pockets being above the level of the lower edges of the said connecting walls, and means whereby said pockets may be raised out of and transferred from the box, said means comprising foldable extensions formed on the upper edge of the end wall of the opposite end pockets of the series.

2. In an egg box, transverse end walls provided with foldable extensions forming cover flaps for the box, spaced longitudinal connecting walls extending therebetween detachably locked thereto, a filler inserted between said connecting walls and foldable so as to form therewith a series of catenary suspensory unitary egg enveloping pockets the bottoms of which are above the level of the lower edges of the said connecting walls, the said walls being slotted to receive said filler the pocket connecting portions of which form transverse walls fitting the said slots, the upper edges of the last mentioned walls extending above the upper edges of the longitudinal connecting walls and the filler being provided on its opposite free ends with foldable gripping portions.

Dated at Smithers, B. C., this 21st day of July, 1917.

JOSEPH LEOPOLD COYLE.

Copies of this patent may be obtained for five cents each, by addressing the "Commissioner of Patents, Washington, D. C."